United States Patent
Matsumura

(10) Patent No.: US 8,360,877 B2
(45) Date of Patent: Jan. 29, 2013

(54) INPUT OF MESSAGE TO BE EXCHANGED BETWEEN GAME APPARATUSES CONNECTED TOGETHER FOR COMMUNICATION THEREAMONG

(75) Inventor: Yasushi Matsumura, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 399 days.

(21) Appl. No.: 12/688,008

(22) Filed: Jan. 15, 2010

(65) Prior Publication Data

US 2010/0184516 A1    Jul. 22, 2010

(30) Foreign Application Priority Data

Jan. 16, 2009   (JP) ................................ 2009-008004

(51) Int. Cl.
*A63F 9/24*    (2006.01)
*A63F 13/00*    (2006.01)

(52) U.S. Cl. ............................... 463/30; 463/42; 463/43

(58) Field of Classification Search ........................ None
See application file for complete search history.

(56) References Cited

U.S. PATENT DOCUMENTS 7,729,250 B2 * 6/2010 Matoba ...................... 370/230.1
2008/0139308 A1 6/2008 Kamiyama et al.

FOREIGN PATENT DOCUMENTS

JP      2002-346230      12/2002

OTHER PUBLICATIONS

"Weekly FAMITSU," Enterbrain Inc., Oct. 24, 2008, vol. 23, No. 43, pp. 28-33 (Circulated on Oct. 10, 2008).
"Final Fantasy Crystal Chronicles: Echoes of Time," Square Enix Co., Jan. 20, 2009, available at http://www.square-enix.co.jp/ffcc/eot/ (Released on Nov. 21, 2008).
"Weekly FAMITSU," Enterbrain Inc., Jan. 2, 2009, vol. 24, No. 2, pp. 208-209 (Circulated on Dec. 19, 2008).
"Weekly FAMITSU," Enterbrain Inc., Nov. 28, 2008, vol. 23, No. 48, pp. 216-217 (Circulated on Nov. 14, 2008).
"Final Fantasy Crystal Chronicles : Echoes of Time, DENGEKI PlayStation vol. 434", ASCII Media Works Inc., vol. 14, No. 45, 459th issue , Dec. 12, 2008, pp. 194-195.
"Final Fantasy Crystal Chronicles : Echoes of Time, FAMITSU Connect! On", Entertainment, Inc., vol. 26, Jan. 10, 2009, pp. 40-41.
Japan Office action in JP 2009-008004, dated Jan. 18, 2011 along with an english translation thereof.
"Final Fantasy Crystal Chronicles : Echoes of Time, FAMITSU Connect! On", Enterbrain, Inc., vol. 26, Jan. 10, 2009, pp. 40-41.

*Primary Examiner* — Melba Bumgarner
*Assistant Examiner* — George Howarah
(74) *Attorney, Agent, or Firm* — Greenblum & Bernstein, P.L.C.

(57) ABSTRACT

Multiple game machines communicating with one another progress a game while exchanging messages with one another. A screen showing the progress state of the game is displayed on a first LCD included in each game machine. When the progress state of the game displayed on the first LCD becomes a predetermined game situation, an icon prestored in association with the game situation is displayed in an icon display area provided on a second LCD having a touch panel provided on the front side thereof. When a player touches the displayed icon using a stylus, message buttons prestored in association with the game situation of the touched icon are displayed on the second LCD. When the player touches any one of the displayed message buttons with the stylus to select it, a message corresponding to the selected message button is input.

17 Claims, 5 Drawing Sheets

INPUT OF MESSAGE TO BE EXCHANGED BETWEEN GAME APPARATUSES CONNECTED TOGETHER FOR COMMUNICATION THEREAMONG

CROSS-REFERENCE TO RELATED APPLICATION

The present disclosure relates to subject matter contained in Japanese Patent Application No. 2009-008004, filed on Jan. 16, 2009, the disclosure of which is expressly incorporated herein by reference in its entirety.

BACKGROUND OF THE INVENTION

1. Field of the Invention

The present invention relates to a game apparatus which is in communication with at least one other game apparatus to progress a game while exchanging a message therewith, and, more particularly, to inputting of a message.

2. Description of the Related Art

In a network game which is played by a plurality of game apparatuses connected together over a network, individual players exchange messages with one another in real time to improve communications among unacquainted players. The message-exchanging communications among the players may be adopted to a game which is played among a plurality of game apparatuses by friends through infrared communication or the like.

In such a game which progresses while exchanging a message, each player inputs a message from a keyboard connected to the game apparatus or inputs a message through a software keyboard. It is very difficult for a player to input a message at a good timing with such a scheme in a game which demands multiple basic operations in the proper progress of the game, such as a battle in an action game or a role playing game.

There is a method of registering a plurality of message candidates assigned to operational buttons beforehand, and reading and selecting a registered message candidate at the time of inputting the message. It is apparent that the number of operational buttons for which message candidates associated therewith can be registered is limited, and it is difficult to input an adequate message according to the game situation at any time.

To overcome the difficulty of the aforementioned message input, Japanese Patent Application Laid-Open No. 2002-346230 discloses a game which displays, on a display device, a message group containing one or more messages according to the game situation and allows a player to select a desired message from message options included in the message group.

Although the game described in Japanese Patent Application Publication No. 2002-346230 displays message options according to the game situation when the game situation becomes a predetermined situation, message exchange among players are just collateral in the entire progress of the game. A player who does not like such a message exchange as a communication with another player may feel tiresome about abrupt display of the message options as implemented in the game described in Japanese Patent Application Publication No. 2002-346230.

Even a player who likes a message exchange as a communication among players may feel tiresome about abrupt display of message options when, for example, he/she is busy advancing the game and has no room for communications with other players. In case where the game situation changes rapidly (which is likely to occur in a battle between a player character and an opponent character), the game described in Japanese Patent Application Publication No. 2002-346230 does not properly display message options, which may disable the player to input even an adequate message as a result.

SUMMARY OF THE INVENTION

Accordingly, it is an object of the present invention to provide a game apparatus or the like which allows a player to easily input a message for message exchange between game apparatuses communicating with each other without being bothered.

According to a first aspect of the invention, there is provided a game apparatus, connected to at least one other game apparatus by a communication device, that progresses a game while exchanging messages with the other game apparatus and displays an image according to progress of the game on a display device. The game apparatus includes a progress instruction input acceptor that accepts an instruction for progressing the game, excluding message exchange, input by an operation of a player. The game apparatus further includes a game processor that executes a processing for progressing the game, excluding message exchange, according to the instruction accepted by the progress instruction input acceptor and predetermined progress information received from the other game apparatus. The game apparatus further includes a position input acceptor that accepts an input corresponding to a display position on the display device based on an operation by the player. The game apparatus further includes a game situation data storage that stores, in association with a plurality of game situations, a message group containing one or more messages corresponding to the game situation and an icon of which form represents contents of the messages included in the message group. The game apparatus further includes a game situation determiner that determines whether a current game situation of the game progressed by the game processor corresponds to any one of the game situations stored in the game situation data storage. The game apparatus further includes an icon display that, when the game situation determiner determines that the current game situation corresponds to any one of the stored game situations, displays the icon stored in association with the corresponding game situation on the display device. The game apparatus further includes a message display that, when the position input acceptor accepts the input corresponding to the displayed icon, displays the messages included in the message group corresponding to the icon to which the position input acceptor accepts the input on the display device. The game apparatus further includes a selected message transmitter that, when the position input acceptor accepts the input corresponding to any one of the displayed messages, transmits the message to which the position input acceptor accepts the input to the other game apparatus from the communication device. The game apparatus further includes an received message display that displays, on the display device, a message transmitted from the other game apparatus and received by the communication device. In the game apparatus, in a case where the position input acceptor accepted an input corresponding to the displayed message within a predetermined time period before a current point of time, the game situation determiner determines the current game situation of the game progressed by the game processor based on the message on which the input is accepted within the predetermined time period.

The game apparatus according to the invention progresses a game with another game apparatus connected thereto by the communication device. In progressing a game on the game apparatus, an instruction input for progressing the game is accepted from the progress instruction input acceptor according to a player's operation. The game is progressed according to the instruction input from the progress instruction input acceptor and predetermined progress information which is transmitted and received among game apparatuses. The player progresses the game while exchanging a message with another player who plays the game on another game machine in the process of progressing the game.

The game situation specific data storage stores data on a message group containing one or more messages according to a game situation, and data on an icon of a form representing contents of messages included in the message group. When the progress state of the game becomes one corresponding to any one of the game situations stored in the game situation specific data storage, an icon whose data is stored in the game situation specific data storage in association with the corresponding game situation is displayed on the display device. When the player makes an input corresponding to the icon displayed on the display device by the icon display from the position input acceptor, each message included in the message group corresponding to the input-made icon is displayed on the display device. When the player makes a position input corresponding to a desired message among the messages included in the message group, the input-made message is selected.

With the game apparatus according to the invention, to input a message according to the game situation, the player simply needs to make position inputs with respect to the icon and message which are sequentially displayed on the display device. Therefore, the player can easily input a message according to the game situation even while performing basic operation (inputting an instruction) needed for the proper progress of the game. Because only an icon is displayed on the display device according to a change in the game situation while the player has not performed an operation other than the basic operations needed for the progress of the game, displays other than the display of the progress of the game can be minimized. Therefore, the player is not worried about displays other than the display of the progress of the game.

The game apparatus according to the invention does not make abrupt display of a message included in the message group according to a change in the game situation. The game apparatus according to the invention merely displays an icon unless the player makes a position input corresponding to the icon displayed on the display device. Even with the game situation changing from time to time, a change in the contents to be displayed on the display device (an icon, not a message, herein) does not become too large. The contents displayed on the display device do not change rapidly according to a change in the game situation, which would otherwise cause the player to hesitate in determining what is displayed on the display device. Accordingly, the player can properly input a desired message according to the progress state of the game.

Even when another player similarly inputs an instruction in the game apparatus of the another player and the game is similarly progressed according to the instruction input, the game situation determiner determines that the game situation is different depending on whether the another player inputs an instruction upon reception of a message selected earlier by the player. When another player inputs an instruction upon reception of a message selected earlier by the player even though the situation of the game itself is the same, it is possible to input a message different from the one in a different case. This can allow the player to make an adequate response to a message from another player, thus ensuring smoother communications between players.

According to a second aspect of the invention, there is provided a method executed by a computer apparatus for communicating with at least one other computer apparatus, progressing a game while exchanging messages with the other computer apparatus, and displaying an image according to progress of the game on a display device. The computer apparatus includes a progress instruction input controller that inputs an instruction for progressing the game, excluding message exchange, by an operation of a player, a position input controller that inputs a position corresponding to a display position on the display device based on an operation by the player, a storage that stores data, and a communication device that transmits and receives data to and from the other computer apparatus. The method includes storing, in the storage, in association with each of a plurality of game situations, a message group containing one or more messages corresponding to the game situation, and an icon of which form represents contents of the messages included in the message group. The method further includes progressing the game, excluding message exchange, according to the instruction input by the progress instruction input controller and predetermined progress information received from the other computer apparatus. The method further includes determining whether a current game situation of the progressed game corresponds to any of the game situations. The method further includes displaying, on the display device, an icon stored in association with the corresponding game situation when it is determined that the current game situation of the progressed game corresponds to any of the stored game situation. The method further includes displaying, when an input corresponding to the displayed icon is made by the position input controller, the messages included in the message group corresponding to the icon to which input is made by the position input controller on the display device. The method further includes transmitting, when an input corresponding to any one of the displayed messages is made by the position input controller, the message to which the input was made to the other computer apparatus from the communication device. The method further includes displaying the message received by the communication device, on the display device. In the method, in a case where an input corresponding to the displayed message was made by the position input controller within a predetermined time period before a current point of time, the game situation determining step determines the current game situation of the progressed game based on the message to which the input was made in the predetermined time period.

According to a third aspect of the invention, there is provided a computer readable recording medium recording a program which is executed by a computer apparatus for communicating with at least one other computer apparatus, progressing a game while exchanging messages with the other computer apparatus, and displaying an image according to progress of the game on a display device. The computer apparatus includes a progress instruction input device that inputs an instruction for progressing the game, excluding message exchange, by an operation of a player, a position input device that inputs a position corresponding to a display position on the display device based on an operation the player, a storage that stores data, and a communication device that transmits and receives data to and from the other computer apparatus. The program causes the computer apparatus to store, in the storage, in association with each of a plurality of game situations, a message group containing one or more messages corresponding to the game situation, and an icon of which form represents contents of the messages included in the message group. The program further causes the computer apparatus to progress the game, excluding message exchange, according to the instruction input from the progress instruction input device and predetermined progress information received from the other computer apparatus. The program further causes the computer apparatus to determine whether a current game situation of the progressed game corresponds to any one of the stored game situations. The program further causes the computer apparatus to display, on the display device, an icon stored in association with the corresponding game situation when it is determined that the current game situation of the progressed game corresponds to any one of the stored game situations. The program further causes the computer apparatus to display, when an input corresponding to the displayed icon is made by the position input device, the messages included in the message group corresponding to the icon to which input is made by the position input device on the display device. The program further causes the computer apparatus to transmit, when an input corresponding to any one of the displayed messages is made by the position input device, the message to which the input was made to the other computer apparatus from the communication device. The program further causes the computer apparatus to display, on the display device, the message transmitted from the other computer apparatus and received by the communication device. In the recording medium, in a case where an input corresponding to the displayed message was made by the position input device within a predetermined time period before a current point of time, the game situation determining step determines the current game situation of the progressed game based on the message to which the input was made in the predetermined time period.

DETAILED DESCRIPTION OF THE PREFERRED EMBODIMENT

A preferred embodiment of the present invention will be described below with reference to the accompanying drawings.

Figure 1:
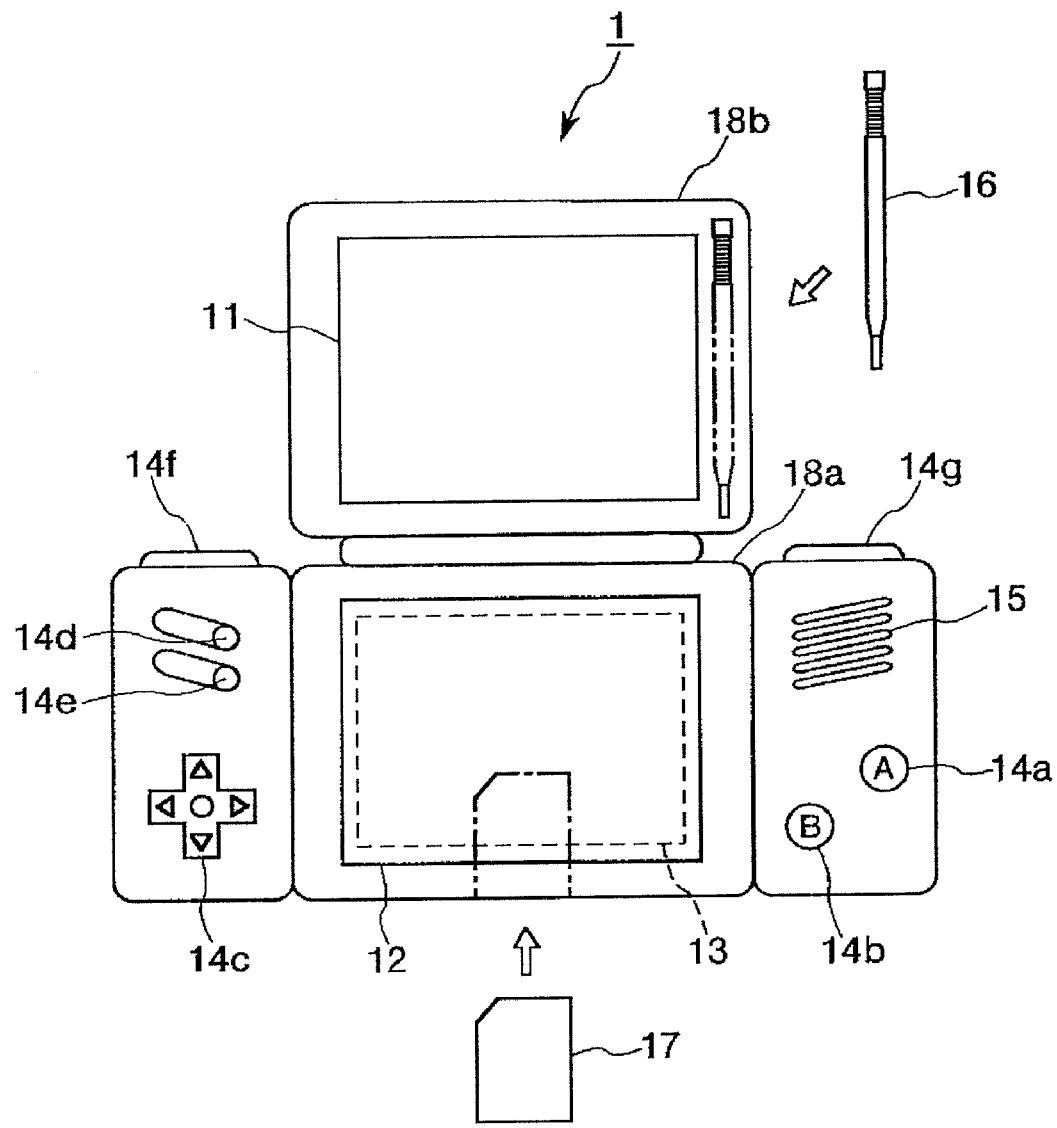
FIG. 1 is an outline diagram showing the configuration of a game machine according to an embodiment of the present invention.

FIG. 1 is an outline diagram showing the configuration of a game machine 1 according to an embodiment of the invention. A portable game machine is illustrated as one example of the game machine 1. In FIG. 1, the game machine 1 is configured to have two liquid crystal displays (LCDs) 11 and 12 accommodated in a housing 18 at predetermined locations.

In case where the first liquid crystal display (hereinafter referred to as "LCD") 11 and the second LCD 12 are accommodated one over the other, the housing 18 includes a lower housing 18a and an upper housing 18b which is rotatably supported at a part of the upper side of the lower housing 18a.

The upper housing 18b has a planar shape slightly larger than the planar shape of the first LCD 11, and has an opening formed in such a way as to expose the display screen of the first LCD 11 from one major surface. The lower housing 18a has a planar shape set laterally longer than the upper housing 18b, and has an opening formed at substantially the laterally center portion to expose the display screen of the second LCD 12. The lower housing 18a also has a sound hole for a speaker 15 formed one of the right and left sides sandwiching the second LCD 12, and an operational switch section 14 mounted to the right and left sides sandwiching the second LCD 12.

The operational switch section 14 includes an operational switch 14a (hereinafter called "A button 14a"), an operational switch 14b (hereinafter called "B button 14b"), a direction instructing switch (hereinafter called "arrow key pad") 14c, a start switch 14d, a select switch 14e, a side switch 14f (hereinafter called "L button 14f"), and a side switch 14g (hereinafter called "R button 14g").

The A button 14a and the B button 14b are mounted on one major surface of the lower housing 18a on the right side of the second LCD 12. The A button 14a and the B button 14b are used to, for example, allow a player to input predetermined instructions in a game according to the embodiment. The arrow key pad 14c is mounted on one major surface of the lower housing 18a on the left side of the second LCD 12. The arrow key pad 14c is used to input the direction on the game screen (including the moving direction of a player character), e.g., to instruct the moving direction of a cursor or to instruct the moving direction within the display range of the second LCD 12 to be described later. The L button 14f and the R button 14g are provided to the left and right of the upper surface (upper side surfaces) of the lower housing 18a. The L button 14f and the R button 14g are used to input predetermined instructions.

A touch panel 13 (broken line area in FIG. 1) is mounted to the top surface of the second LCD 12. The touch panel 13 may be any one of, for example, a resistance film type, an optical type (infrared type), and a static capacitive coupled type, and detects and outputs the coordinate position of a stylus 16 (or possibly a finger) when the top surface of the touch panel 13 is touched with the stylus 16 for a pressing operation or a moving operation. In the game according to the embodiment, the touch panel 13 is used to select an icon (to be described later) or a message (to be described later) displayed on the second LCD 12.

A retainer hole (two-dot chain line area in FIG. 1) is formed near a side surface of the upper housing 18b for retaining the stylus 16 to operate the touch panel 13 as needed. The stylus 16 is retained in the retaining hole. A cartridge insertion part (one-dot chain line area in FIG. 1) where a game cartridge (hereinafter called "cartridge") 17 incorporating a memory (e.g., ROM) storing a game program is detachably mounted is formed at one part of a side surface the lower housing 18a. The cartridge 17 is an information storage medium to store the game program, and is, for example, a non-volatile semiconductor memory, such as ROM or flash memory. A connector (see FIG. 2) to electrically connect to the cartridge 17 is incorporated in the cartridge insertion part.

Further, an electronic circuit board having various kinds of electronic parts, such as a CPU, is accommodated in the lower housing 18a (or possibly the upper housing 18b). An infrared communication port (see FIG. 2) for infrared communication with another game machine 1 located nearby and a radio communication port (see FIG. 2) for radio communication with a wireless router connected to the Internet are also accommodated in the lower housing 18a (or possibly the upper housing 18b).

Figure 2:
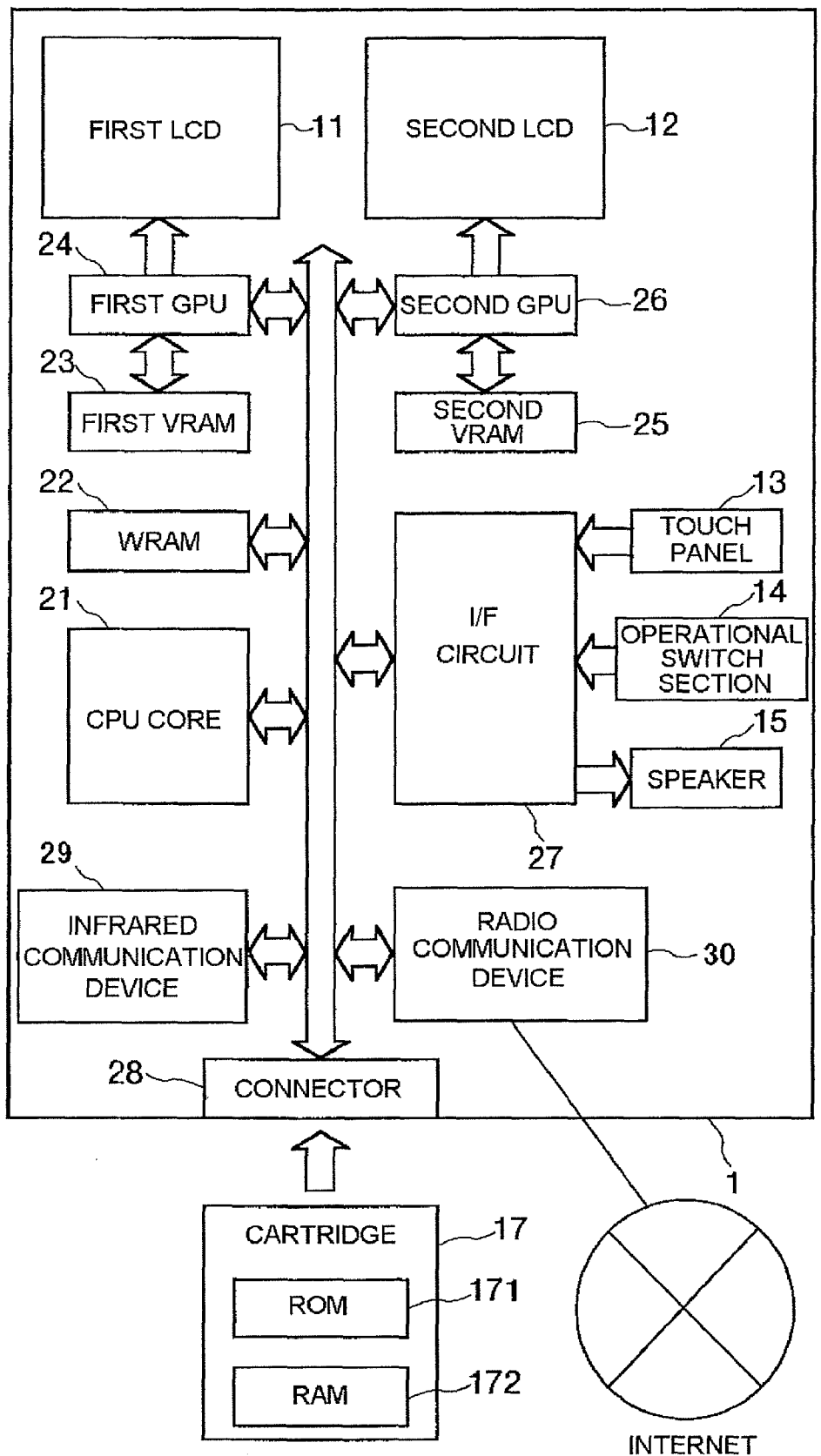
FIG. 2 is a block diagram showing the circuit configuration of the game apparatus according to the embodiment of the invention.

The circuit configuration of the game machine 1 will be described. FIG. 2 is a block diagram showing the circuit configuration of the game machine 1. In FIG. 2, a CPU core 21 is mounted on the electronic circuit board to be mounted in the housing 18. A connector 28 to connect to the cartridge 17, an input/output interface (I/F) circuit 27, a first graphic processing unit (first GPU) 24, a second graphic processing unit (second GPU) 26, and a working RAM (WRAM) 22 are connected to the CPU core 21 by a predetermined bus. The CPU core 21 has a ROM (a part of which is a data rewritable EEPROM) storing a system program and a built-in timer.

The cartridge 17 is detachably connected to the connector 28. The cartridge 17 is a storage medium for storing the game program as mentioned above, and, specifically, has a ROM 171 to store the game program and a RAM 172 to store backup data in a rewritable manner. The game program stored in the ROM 171 of the cartridge 17 is loaded into the WRAM 22, and the game program loaded thereinto is executed by the CPU core 21. Temporary data and data for generating images, which are acquired by the CPU core 21 executing the game program, are stored in the WRAM 22. The ROM 171 stores the game program which is a group of commands which are executable by the computer of the game machine 1, particularly, the CPU core 21, and a data group. This game program is loaded into the WRAM 22, as needed, to be executed.

A first video RAM (hereinafter called "first VRAM") 23 is connected to the first GPU 24, and a second video RAM (hereinafter called "second VRAM") 25 is connected to the second GPU 26. The first GPU 24 generates a first game image based on the data stored in the WRAM 22 for generating images, and writes the first game image in the first VRAM 23 in response to an instruction from the CPU core 21. The second GPU 26 generates a second game image based on the data stored in the WRAM 22 for generating images, and writes the second game image in the second VRAM 25 in response to an instruction from the CPU core 21. One frame time of images included in the data output from the first GPU 24 and the second GPU 26 is, for example, 1/30 second. The first GPU 24 and the second GPU 26 write a single image in a frame unit (i.e., in the unit of 1/30 second).

The first GPU 24 is connected to the first LCD 11, and the second GPU 26 is connected to the second LCD 12. The first GPU 24 outputs the first game image written in the first VRAM 23 to the first LCD 11 in response to an instruction from the CPU core 21. Then, the first LCD 11 displays the first game image output from the first GPU 24. The second GPU 26 outputs the second game image written in the second VRAM 25 to the second LCD 12 in response to an instruction from the CPU core 21. Then, the second LCD 12 displays the second game image output from the second GPU 26.

The touch panel 13, the operational switch section 14 and the speaker 15 are connected to the I/F circuit 27. The I/F circuit 27 serves to exchange data between external input/output devices, such as the touch panel 13, the operational switch section 14 and the speaker 15, and the CPU core 21.

The touch panel 13 (including a device driver for the touch panel) has a coordinate system corresponding to the coordinate system of the second VRAM 25, and outputs coordinate data corresponding to a position input (instructed) by the stylus 16 or the like to a predetermined register provided in the WRAM 22. For example, the resolution of the display screen of the second LCD 12 is 256 dot×192 dot, while the detection accuracy of the touch panel 13 is 256 dot×192 dot which corresponds to the resolution of the display screen. The detection accuracy of the touch panel 13 may be lower or higher than the resolution of the display screen of the second LCD 12. The speaker 15 is located inside the aforementioned sound hole to output audio sounds generated according to the game in play.

An infrared communication device 29 executes infrared communication with the other game machine via the infrared communication port to transmit/receive data for progressing the game including a message input by the player. Because the infrared communication device 29 uses infrared rays (which have inherent problems such that the communication distance is short and they cannot avoid an obstruction) for transmission/reception of data in a form unique to the game machine 1, another player who can progress the game in cooperation using the infrared communication with the infrared communication device 29 is limited to a player who can play the game in an opposite position, such as one located in the same room.

A radio communication device 30 executes radio communication with a wireless router connected to the Internet via the radio communication port to communicate with the other game machine over the Internet to transmit/receive data for progressing the game including a message input by the player. The radio communication device executes communication according to a general-purpose protocol, such as TCP/IP, and can communicate with the other game machine at a remote location via a server unit located on the Internet. The other game machine to be communicated using the radio communication device 30, i.e., the other player who plays in cooperation, can be selected at random by the server unit.

The game machine 1 which is adapted to this embodiment is not designed to allow three or more players to play the game in cooperation by carrying out both communication using the infrared communication device 29 and communication using the radio communication device 30 at the same time. This is because in a case where one of two game machines which carry out infrared communication can be connected to the Internet properly while the other one which carries out infrared communication cannot be connected to the Internet, the game may not progress properly.

The game machine 1 which is adapted to the embodiment is configured to show the display in a language selected from a plurality of languages, such as Japanese, English, German and French. The setting of the language for the display is written in the EEPROM of the CPU core 21; the default setting is the language of the area where the game machine 1 is to be sold (e.g., Japanese when selling the game machine 1 in Japan).

The game according to the embodiment will be described. The game according to the embodiment is, for example, a role playing game which allows the player of the game machine 1 to move his/her player character on a field formed in the virtual space by operating the touch panel 13 and/or the operational switch section 14 and solve challenges set in the field. The challenges that should be solved by the player character include battles with opponent characters. This game can be progressed in a stand-alone fashion without being connected to the other game machine.

Of course the game machine 1 may be connected to another single game machine or a plurality of other game machines (which may have the same configuration as that of the game machine 1 and will be hereinafter called "the other game machine" or "the other game machines") using the infrared communication device 29 or the radio communication device 30 to solve a challenge in the game in cooperation with the player character operated by the player of the other game machine. In this case, one of the game machine 1 and the other game machine (the other game machines) serves as a host computer. The other game machine other than the game machine which serves as the host computer sends an instruction which is made by the player of the other game machine to the player character of the player thereof by operating the touch panel 13 or the operational switch section 14 to the game machine serving as the host computer.

The game machine serving as the host computer progresses the game according to an instruction which is made by the player of this game machine to the player character of the player thereof by operating the touch panel 13 or the operational switch section 14, and an instruction sent from the other game machine than the game machine serving as the host computer, and sends back information indicating the progress result to the other game machine than the game machine serving as the host computer. To simplify the description, it is assumed hereinafter that the game machine 1 serves as a host computer, and there is a single game machine (as "the other game machine") which does not serve as a host computer.

In case of progressing the game with the game machine 1 communicating with the other game machine, messages are exchanged therebetween and are displayed on the game screen in addition to the progress the game (of course, inputting of a message is not carried out completely independently from the progress of the game as will be described later).

Figure 3A:
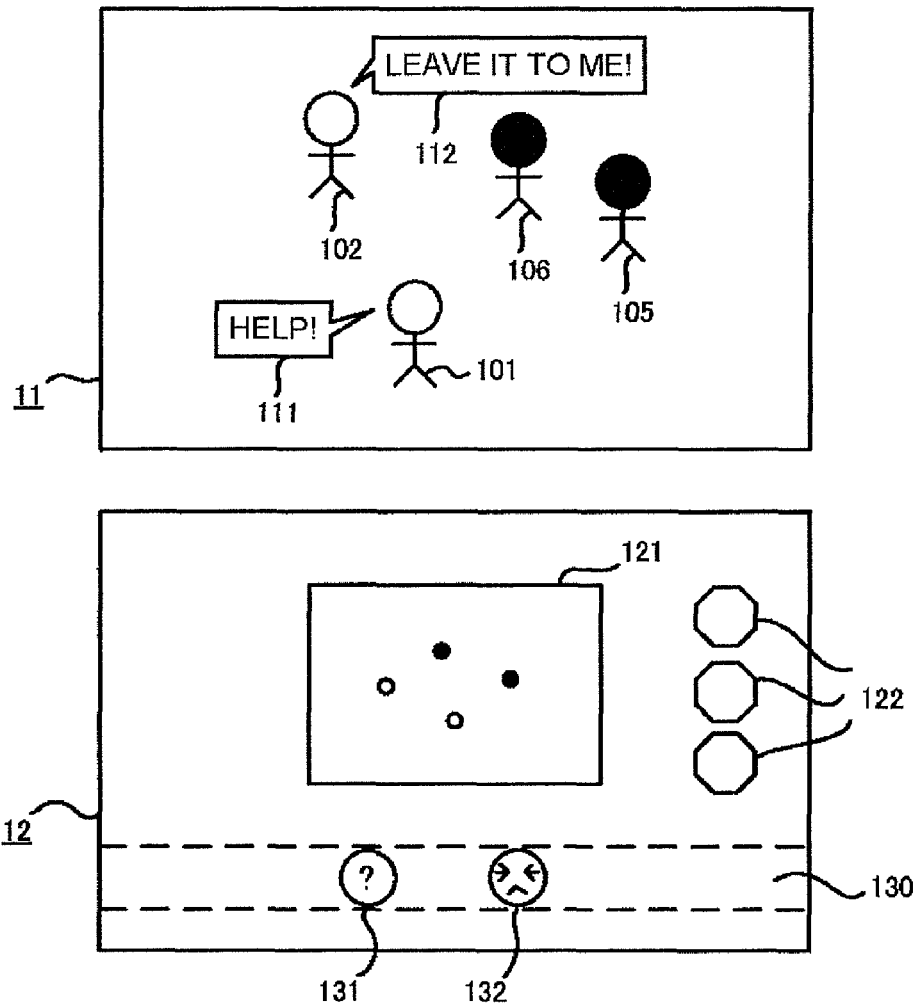
FIGS. 3A and 3B are diagrams showing examples of the display screen of a game according to the embodiment of the invention.
Figure 3B:
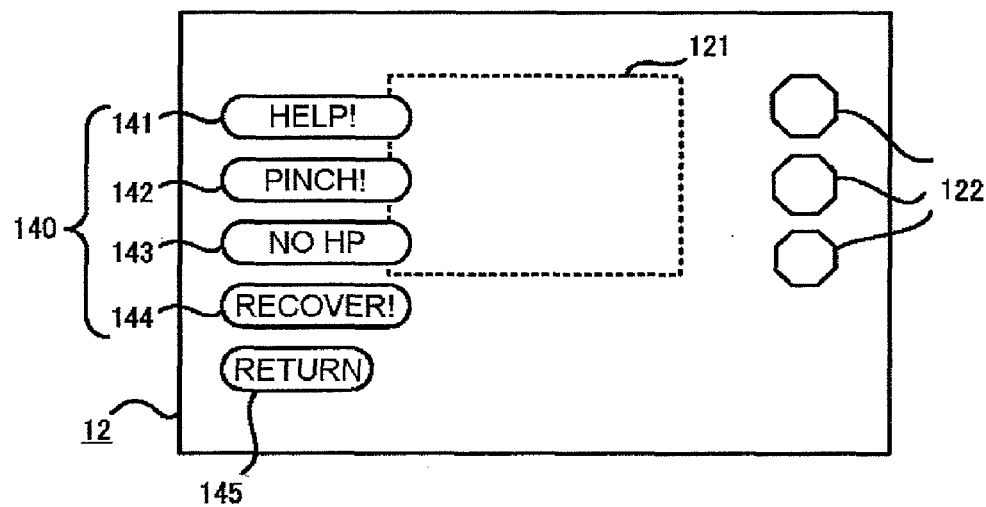

FIGS. 3A and 3B are diagrams showing examples of the display screens displayed on the first LCD 11 and the second LCD 12 when the game is played with the game machine 1 communicating with the other game machine. As shown in FIG. 3A, the first LCD 11 serving as the upper screen displays a screen according to the real-time progress of the game. The screen shows a scene that a player character 101 which is operated by the player of the game machine 1 and a player character 102 which is operated by the player of the other game machine are battling against opponent characters 105 and 106. The screen also shows messages 111 and 112 which are exchanged between the game machine 1 and the other game machine.

The second LCD 12 having the touch panel 13 mounted thereon and serving as the lower screen normally displays a map 121 showing the positional relation among the individual characters and an operation instruction button 122 which inputs an instruction for the player character 101 of the game machine 1. Further, when the progress state of the game displayed on the screen of the first LCD 11 becomes a predetermined game situation (whose details will be given later), icons 131, 132 (whose details will be given later) which are determined according to the game situation are displayed in an icon display area 130 provided at a lower portion of the second LCD 12 while moving from right to left.

When the player of the game machine 1 touches the icon 131 or 132 displayed as moving on the second LCD 12 in FIG. 3A, a message group 140 (whose details will be given later) including message buttons 141 to 144 corresponding to the touched icon 131 or 132 is displayed as shown in FIG. 3B. In addition, a return button 145 is displayed for returning to the original screen (screen shown in FIG. 3A in this example) without selecting any one of the message buttons 141 to 144.

When the player of the game machine 1 touches one of the message buttons 141 to 144 displayed on the second LCD 12 in FIG. 3B, a message corresponding to the touched one of the message buttons 141 to 144 is displayed as the message 111 of the player character 101. Further, information on the touched one of the message buttons 141 to 144 is sent to the other game machine to display the same message thereon. When one of the message buttons 141 to 144 and the return button 145 is touched, the screen to be displayed on the second LCD 12 returns to the original screen (screen shown in FIG. 3A in this example).

The return button 145 is provided to terminate the display of the screen shown in FIG. 3B without inputting any message and return to the screen shown in FIG. 3A. The messages 111, 112, the message buttons 141 to 144, and the return button 145 are displayed in a language set in the game machine 1.

Figure 4A:
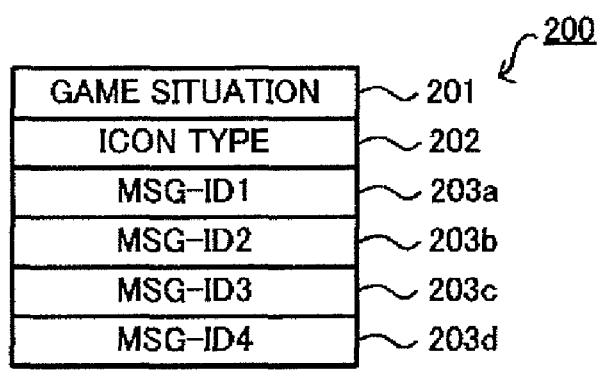
FIGS. 4A and 4B are diagrams showing data for inputting messages in the game according to the embodiment of the invention.
Figure 4B:
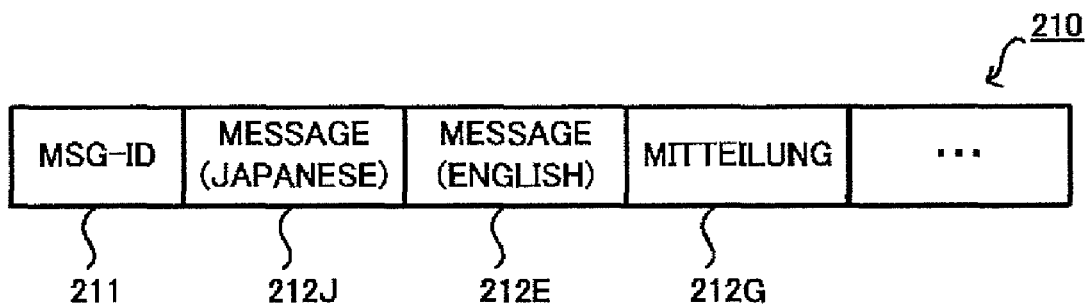

A description will be given of data to be used to input a message according to the progress state of the game when the game is played with the game machine 1 communicating with the other game machine. FIGS. 4A and 4B are diagrams showing data for inputting messages in case of playing the game with the game machine 1 communicating with the other game machine. This data is prestored in the ROM 171 of the cartridge 17, and is loaded into the WRAM 22 as needed. The data for inputting a message includes game situation specific data 200 shown in FIG. 4A and message specific data 210 shown in FIG. 4B.

The game situation specific data 200 shown in FIG. 4A has a game situation 201, an icon type 202, and message IDs 203a to 203d in association with one another. The game situation 201 shows the progress state of the game, in which state an icon (including the icon 131, 132 in FIG. 3A) is to be displayed as moving in the icon display area 130 as shown in FIG. 3A. There are plural types of game situations in which the icon is to be displayed, and the game situation specific data 200 is provided by the number of the types of such game situations.

The icon type 202 shows the form of an icon which is displayed as moving in the icon display area 130, when the corresponding game situation 201 occurs while the game is in progress. The message IDs 203a to 203d are identification information to specify the individual messages of the touched one of the message buttons 141 to 144 to be displayed on the second LCD 12 as shown in FIG. 3B when an icon which is displayed as moving in the icon display area 130 is touched. Although four message IDs 203a to 203d are included in the game situation specific data 200 in FIG. 4A, the game situation specific data 200 may include at least one ID but not more than four message IDs.

The messages corresponding to the message IDs 203a to 203d included in the same game situation specific data 200 associated with the game situation 201 have common contents in association with the game situation 201. The form of the icon indicated by the icon type 202 represents the contents of the message corresponding to the message ID 203a, 203b, 203c, 203d contained in the same game situation specific data 200.

For example, messages corresponding to the message IDs 203a to 203d included in the game situation specific data 200 where the game situation 201 is "HP (Hit Point: value indicating the physical power of the player character which is disabled to move when HP becomes 0) is equal to or smaller than a predetermined quantity" are "Help!", "Pinch!", "No HP", and "Recover" respectively, and the form of the icon indicated by the icon type 202 shows a crying face.

Messages corresponding to the message IDs 203a to 203d included in the game situation specific data 200 where the game situation 201 is "First encounter with another player character" are, for example, "Hello", "Hi", "Nice to meet you", and "My name is XXX (name set for the player character)" respectively, and the form of the icon indicated by the icon type 202 shows a smiling face.

Messages corresponding to the message IDs 203a to 203d included in the game situation specific data 200 where the game situation 201 is "Obtain a new item" are, for example, "What is it?", "Do you know it?", "I wonder how to use it", "Is it useful?" respectively, and the form of the icon indicated by the icon type 202 shows a question mark.

The message specific data 210 shown in FIG. 4B has a message ID 211 and messages 212J, 212E, 212G, ... in different languages associated therewith. That is, messages having the same meaning are registered in different languages; for example, if the Japanese message 212J associated with the message ID 211 is "Tasukete!", the English message 212E is "Help!", the German message 212G is "Hilfe!", and so forth.

When one of the message buttons 141 to 144 in the game machine 1 is touched, the message ID corresponding to the touched message button is sent to the other game machine, whereas the message itself corresponding to the touched message button is not sent to the other game machine. In case where the message button 141 whose message contents are "Help!" as shown in FIG. 3B is touched in the game machine 1 set to the English language, for example, the message ID corresponding to "Help!" is sent to another game machine.

The other game machine which has received this message ID displays a message according to the message ID and the use language set. The message "Help!" is displayed if the use language is set to English, the message "Tasukete!" is displayed if the use language is set to Japanese, or the message "Hilfe!" is displayed if the use language is set to German.

A process for executing the game according to the embodiment will be described below referring to flowcharts of FIGS. 5A and 5B. The following describes a process for a player to input a message according to the progress state of the game, and the descriptions of processes which are not so relevant to the invention, such as a process of displaying an image according to the progress state of the game on the first LCD 11 may be omitted.

Figure 5A:
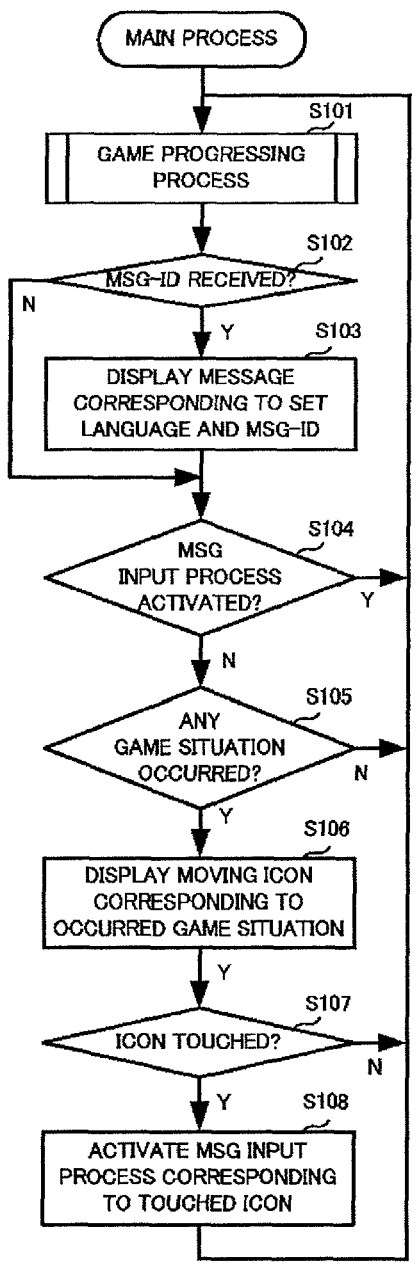
FIGS. 5A and 5B are flowcharts illustrating processes which are executed in the game according to the embodiment of the invention.

FIG. 5A is a flowchart illustrating a main process executed in case of progressing the game according to the embodiment with the game machine 1 communicating with another game machine. In the main process, the CPU core 21 executes a game progressing process of progressing the game according to an instruction given to the player character 101 by the player of the game Machine 1 by operating the touch panel 13 and/or the operational switch section 14 and an instruction received from the other game machine, and transmitting information indicating the progress result to the another game machine (step S101).

The CPU core 21 determines whether a message ID, transmitted from the other game machine in a message input process (see FIG. 5B to be described later) of the other game machine, has been received (step S102). If the message ID has not been received, the CPU core 21 directly goes to a process of step S104. If the message ID has been received, the CPU core 21 displays one of the messages 212J, 212E, 212G, ... registered in the message specific data 210 in association with the received message ID which corresponds to the language set for the game machine 1 on the first LCD 11, which displays the screen corresponding to the progress state of the game, as the message 112 of the player character 102 corresponding to the other game machine (step S103). Then, the CPU core 21 goes to step S104.

In step S104, the CPU core 21 determines whether the message input process (see FIG. 5B), which will be activated in step S108 to be discussed later, is active at the current time. When the message input process is active at the current time, the process directly returns to the process of step S101. Even when the message input process is active at the current time, the game is allowed to progress as the player inputs an instruction for the player character 101 by operating the touch panel 13 and/or the operational switch section 14 in the process of step S101.

When the message input process is not active at the current time, the CPU core 21 determines whether the progress state of the game at the current time corresponds to the game situation 201 included in any game situation specific data 200 (step S105). When the progress state of the game at the current time does not correspond to any game situation, the CPU core 21 directly returns to the process of step S101.

When the progress state of the game at the current time corresponds to any game situation, the CPU core 21 displays an icon of the form corresponding to the icon type 202 registered in the game situation specific data 200 in association with the game situation 201 to which the progress state of the game at the current time corresponds on the icon display area 130 of the second LCD 12 (step S106). If the game situation has just occurred, the corresponding icon is displayed to the right end of the icon display area 130, whereas if the game situation has already occurred before and the corresponding icon has been displayed, the icon is displayed as being shifted leftward by a predetermined distance in the icon display area 130.

With an icon already displayed in the icon display area 130, if a game situation included in different game situation specific data 200 from the game situation specific data 200 corresponding to the already displayed icon has also occurred, the already displayed icon is displayed as being shifted leftward by a predetermined amount in the icon display area 130, and an icon corresponding to the newly occurred game situation is displayed at the right end in the icon display area 130. When the game situation corresponding to the icon displayed so far terminates, this icon is erased from the icon display area 130.

The CPU core 21 determines whether any icon displayed in the icon display area 130 is touched based on the display position of each icon in the icon display area 130 and the touched position on the touch panel 13 (step S107). When no icon is touched, the CPU core 21 returns to the process of step S101.

When any one of the icons is touched, the CPU core 21 activates the message input process referring to the game situation specific data 200 corresponding to the touched icon (step S108). The activated message input process is executed in parallel to the main process. Then, the processing step in the main process returns to the process of step S101.

Figure 5B:
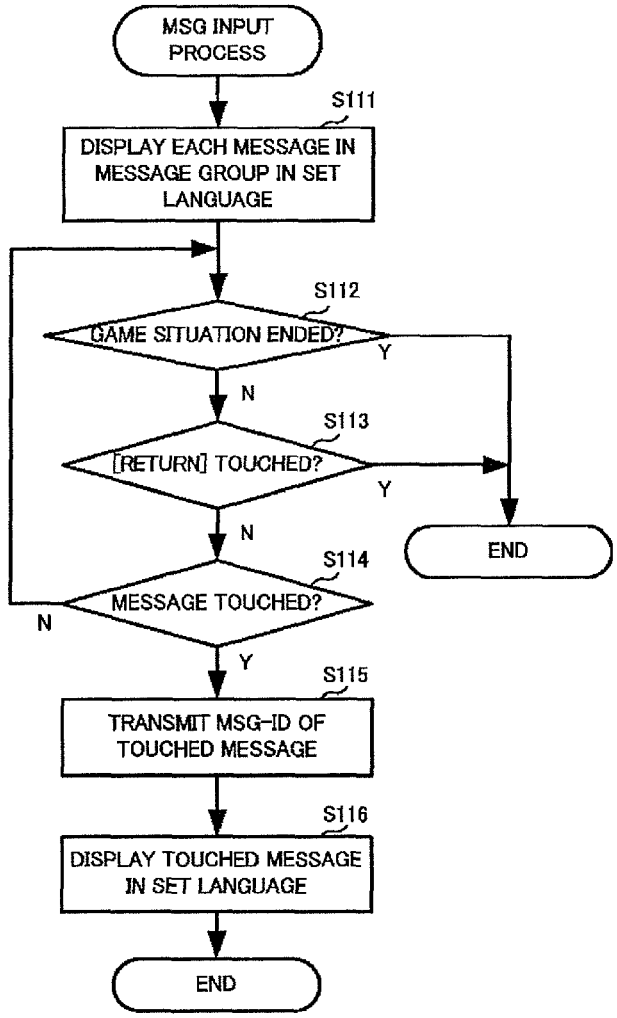

FIG. 5B is a flowchart illustrating the message input process which is activated from the main process. In the message input process, the CPU core 21 reads the message IDs 203a to 203d included in the game situation specific data 200 which is referred to at the time of activating the message input process, and reads one of the messages 212J, 212E, 212G, ... which corresponds to the language set in the game machine 1 for each of the read message IDs 203a to 203d. Then, the CPU core 21 displays the message buttons 141 to 144 containing the messages read in association with the individual message IDs and the return button 145 on the second LCD 12 (step S111).

The CPU core 21 determines whether the game situation 201 included in the game situation specific data 200 which is referred to at the time of activating the message input process has terminated (step S112). When the game situation 201 has ended, the CPU core 21 terminates the message input process. The termination of the message input process can allow the player of the game machine 1 to input an instruction for the player character 101 by operating the touch panel 13 and/or the operational switch section 14 in the game progressing process in step S101 in the main process which is executed in parallel.

When the game situation 201 has not ended, the CPU core 21 determines whether the return button 145 is touched based on the display position of the return button 145 and the touched position of the touch panel 13 by the player (step S113). When the return button 145 is touched by the player, the CPU core 21 terminates the message input process. In this case, because the game situation 201 included in the game situation specific data 200 which is referred to at the time of activating the message input process has not terminated, the icon corresponding to the game situation 201 is displayed in the icon display area 130 again.

When the return button 145 is not touched, the CPU core 21 determines whether any one of the message buttons 141 to 144 is touched, based on the display position of each of the message buttons 141 to 144 and the touched position of the touch panel 13 by the player (step S114). When none of the message buttons 141 to 144 is touched, the CPU core 21 returns to the process of step S112.

When any one of the message buttons 141 to 144 is touched, the CPU core 21 transmits the message ID 203*a*, 203*b*, 203*c*, 203*d* registered in the game situation specific data 200 in association with the touched one of the message buttons 141 to 144 to the other game machine (step S115).

Further, the CPU core 21 displays the message corresponding to one of the message ID 203*a*, 203*b*, 203*c*, 203*d* registered in the game situation specific data 200 in association with the touched one of the message buttons 141 to 144 on the screen showing the game situation in progress displayed on the first LCD 11 as the message 111 for the player character 101 corresponding to the game machine 1 (step S116). Then, the CPU core 21 terminates the message input process.

In the game according to the embodiment, as described above, the game machine 1 is connected to the other game machine to enable the player to progress the game in cooperation with the player character which is manipulated by the player of the other game machine. The game is progressed according to an instruction for the player character by operating the touch panel 13 and/or the operational switch section 14. The game is also progressed according to an instruction received from the other game machine.

While the players of the game machine 1 and the other game machine progress the game based on their operations in cooperation with each other, the players can communicate with each other through message exchange. Inputting messages to be exchanged with each other is carried out by touching the icon 131, 132 displayed in the icon display area 130 according to the game situation, and then touching the message button 141, 142, 143, 144 displayed on the second LCD 12.

That is, the game situation specific data 200 and the message specific data 210 are stored in the ROM 171 of the cartridge 17, and the icon type 202 indicating the form of an icon to be displayed, and selectable message IDs 203*a* to 203*d* are registered in each game situation specific data 200 in association with the game situation 201 triggering the display of the icon (i.e., triggering the input of a message). Accordingly, when a game situation registered in any game situation specific data 200 occurs while the game is in progress, a message can be selected.

To input a message according to the progress state of the game, the player of the game machine 1 needs only to touch the icon 131, 132 and the message button 141, 142, 143, 144, which are sequentially displayed on the second LCD 12. Accordingly, the player is able to easily input a message for communication with the player of another game machine according to the progress state of the game while performing an operation necessary for the advancing the game (operation of the operational switch section 14 and/or touch operation on the operation instruction button 122).

In the situation where the player of the game machine 1 has not performed any operation to make any other inputs than operations necessary for advancing the game, only the icon 131, 132 are displayed on the first LCD 11 and the second LCD 12, whereas messages (message buttons 141 to 144) to be selected for input are not displayed. This minimizes displays different from the display of the progress of the game, so that the player will not be bothered with a tiresome operation.

Further, even if the progress state of the game becomes the game situation 201 registered in any game situation specific data 200, the messages (message buttons 141 to 144) to be selected for input are not displayed immediately, but only the icon 131, 132 is displayed in the icon display area 130. Therefore, the contents (images) displayed on the first LCD 11 and the second LCD 12 (particularly, on the second LCD 12) do not change greatly while the progress state of the game changes from time to time. This prevents occurrence of a case where the display contents rapidly change according to a change in the progress state of the game, which would make it difficult for the player to decide what is displayed. Accordingly, the player is able to adequately select and input a desired message.

That is, the player of the game machine 1 is able to easily confirm the display of the icon 131, 132 in the icon display area 130 and is able to easily understand that the player is in a state of being capable of inputting a message to be exchanged with the player of the other game machine, while performing an operation necessary for the proper progress of the game (operation of the operational switch section 14 and/or touch operation on the operation instruction button 122). In addition, the area where the icon 131, 132 is displayed is limited to the icon display area 130 of the second LCD 12, so that the player will not overlook the displayed icon.

The icon 131, 132 is displayed as moving from right to left in the icon display area 130. Accordingly, even a player who is not able to sufficiently understand the game system (particularly, the message input system) is alerted to watch the icon 131, 132 moving in the icon display area 130. Then, with an attempt to touch the icon 131, 132 moving in the icon display area 130, the player is able to easily understand that this is a component of the system for inputting a message.

When the game situations 201 registered in plural pieces of the game situation specific data 200 may occur simultaneously depending on the progress state of the game, the icons 131, 132 corresponding to the respective game situations 201 occurred are displayed as moving in the icon display area 130. Each of the icons 131, 132 is of the form representing the contents of a message to be selected later. Accordingly, the player can easily determine which icon 131, 132 is to be touched so as to display the desired message.

The player of the game machine 1 should touch the icon 131, 132 representing the contents of a message to be input, and then touch one of the message buttons 141 to 144 displayed on the second LCD 12 to input the desired message. Even if the progress state of the game becomes complicated, the player may not be worried about the order of selection of messages to be input.

Further, when the game situations 201 registered in plural pieces of the game situation specific data 200 occur simultaneously, it is only the icons 131, 132 corresponding to each of the occurred game situations 201 which is displayed on the first LCD 11 and the second LCD 12 at the first stage. A very large number of the message buttons corresponding to the plurality of game situations 201 are not displayed. Because the number of options (icons 131, 132) to be displayed for the operation at the first stage is limited, the player will not be confused with the operation. In addition, because the number of displayed options provided before the player performs any operation is limited, and the display area for each option is limited, the player will not be bothered with displays different from the progress of the game.

The game machine 1 that executes the game according to the embodiment is configured to have displays in the language (which may be the language set in default) selectively set from plural types of languages by the player. Here, text data of messages are not registered in the game situation specific data 200 in association with the game situation 201 and the icon type 202, but the message IDs 203a to 203d by which messages are specifically identified are registered. The messages 212J, 212E, 212G, . . . of different languages are registered in the message specific data 210 in association with the message ID 211.

When the player of the game machine 1 touches one of the message buttons 141 to 144, the message ID corresponding to the touched one of the message buttons 141 to 144 is transmitted to the other game machine. Likewise, in case where the game machine 1 receives the message ID transmitted from the other game machine, one of the messages 212J, 212E, 212G, . . . of different languages registered in the message specific data 210 in association with the message ID which corresponds to the language set in the game machine 1 is displayed as the message 112 generated by the player character 102 of the other game machine.

The game machine 1 can not only communicate with the other game machine by infrared communication using the infrared communication device 29, but also communicate with the other game machine at a remote location over the Internet using the radio communication device 30. Displaying messages in the language set in the above manner can allow even players who use different languages to play the game together while establishing communications with each other through message exchange.

The invention is not limited to the foregoing embodiment, and can be worked out in various other modifications. The following describes modifications of the embodiment which are adaptable to the invention.

In the foregoing embodiment, the game machine 1 is connected to the other game machine by peer to peer by infrared communication or over the Internet, and the game machine 1 and the other game machine execute the game with the game machine 1 serving as a host computer. However, the invention can be adapted to a network game for which the game machine 1 and the other game machine are connected together via a server unit located on the Internet. In this case, the players of the game machine 1 and the other game machine may transmit instructions for their own player characters to the server unit, and the server unit may execute the process of progressing the game, and return the processing result to the game machine 1 and the other game machine.

Although, in the foregoing embodiment, a message to be exchanged between the game machine 1 and the other game machine is input by touching the icon 131, 132 displayed according to the game situation and then touching one of the message buttons 141 to 144 displayed as a result, a scheme of inputting a message through a keyboard connected to the game machine 1 or a software keyboard may be used together. In this case, when a message is exchanged via a server unit located on the Internet, the message may be automatically translated according to the settings of the languages in the game machine 1 and the other game machine before being exchanged.

In the foregoing embodiment, when the progress state of the game becomes the game situation 201 registered in any game situation specific data 200, the icon 131, 132 corresponding to the game situation 201 is displayed as moving in the icon display area 130, drawing the player's attention. Then, it is expected that the player who is alerted to the icon 131, 132 displayed as moving will attempt to touch the icon 131, 132, and thus understand the game system.

However, even if the player is alerted to the icon 131, 132 displayed as moving, the player still may not understand the game system unless he/she performs a touch operation. Furthermore, the player may not understand the game system by merely performing a touch operation on the icon 131, 132 once. In this respect, a prompt statement like "Touching an icon, you can input a message." may be displayed on the first LCD 11 or the second LCD 12 while the icon 131, 132 is displayed as moving in the icon display area 130. This prompt statement may be displayed until the game progresses to a certain level, or the icon 131, 132 is touched by a certain number of times.

Further, a tutorial explaining the game system may illustrate that touching the icon 131, 132 displayed in motion in the icon display area 130 will display the message buttons 141 to 144 and touching one of the message buttons 141 to 144 can input a corresponding message.

In the foregoing embodiment, when the progress state of the game becomes the game situation 201 registered in any game situation specific data 200, the icon indicated by the icon type 202 corresponding to this game situation 201 is displayed in the icon display area 130. Alternatively, the game situation may be determined depending on a message input by touching one of the message buttons 141 to 144 within a predetermined time period before the current time.

For example, it is assumed that the player character 102 of the player of the other game machine attacks the opponent character 105, 106 while the player character 101 of the player of the game machine 1 is in a battle with the opponent character 105, 106. Here, a case is assumed where the player of the game machine 1 has input a message "Help!" slightly before the player character 102 attacks the opponent character 105, 106, and. Also, another case is assumed where the player of the game machine 1 has not input any message.

In the former game situation, a smiling icon may be displayed in the icon display area 130, and touching the icon may display message buttons for inputting messages, such as "Thank you", "Thanks", and "Help me next too". In the latter game situation, no icon may be displayed in the icon display area 130, and therefore no message can be input. Alternatively, in the latter game situation, an angry icon may be displayed in the icon display area 130, and touching this icon may display message buttons for inputting messages, such as "Don't interfere!", "Leave it to me!", and "I can handle it myself!".

Even in the same proper progress state of the game, a different message can be input according to a message input earlier by the player of the game machine 1, or according to no entry of any message, thus ensuring smoother communications between players.

According to the foregoing embodiment, the game machine 1 has the infrared communication device 29 which ensures communication with another game machine located nearby and the radio communication device 30 which ensures communication with another game machine at a remote location over the Internet, and can progress the game in cooperation with the other game machine using either the infrared communication device 29 or the radio communication device 30. Even when communication is established by either communication device, the process for exchanging a message between the game machine 1 and another game machine is the same.

The player of the other game machine which is in communication using the infrared communication device 29 is likely to be familiar with the player of the game machine 1, whereas the player of another game machine which is in communication over the Internet using the radio communication device 30 should not necessarily be familiar with the player of the game machine 1. In addition, while the player of the game machine 1 can communicate with the player of the other game machine which is in communication using the infrared communication device 29 without exchanging messages, whereas the player of the game machine 1 communicating with the player of the other game machine over the Internet using the radio communication device 30 has a difficulty in making the communication without exchanging messages.

Accordingly, the game situation 201 included in the game situation specific data 200 stored in the ROM 171 of the cartridge 17 may be classified not merely by the progress state of the game but also according to the type of the communication device used in establishing communication. While the progress state of the game is the same, message IDs of messages having frank contents such as those used in conversation with friends may be registered in the message IDs 203a to 203d associated with the game situation 201 in which the game machine 1 is communicating with the other game machine using the infrared communication device 29, and message IDs of messages in more polite phrases may be registered in the message IDs 203a to 203d associated with the game situation 201 in which the game machine 1 is communicating with the other game machine using the radio communication device 30.

In this manner, even with the progress state of the game being the same, the message buttons 141 to 144 containing messages having different contents are displayed by touching an icon, depending on whether the game is played while in close communication with the other game machine by using the infrared communication device 29, or the game is played while communicating with the other game machine over the Internet by using the radio communication device 30. This can allow the players to have smoother communications according to the relation between the players.

The foregoing description has been given of the case where the game according to the invention is executed on the game machine 1 having two display devices, namely the first LCD 11 and the second LCD 12, and a pointing device or the touch panel 13. However, the game according to the invention may be executed on a computer device other than the game machine 1 as long as the computer device has at least a display device to display images for the game, and a position input device capable of inputting a position on the display device. The computer device which executes the game according to the embodiment may be a device dedicated for the game or a general-purpose computer like a personal computer, and a portable type or a desk-top type does not matter.

In the foregoing embodiment, the program and data for the game machine 1 are stored in the ROM 171 of the cartridge 17 for distribution. The recording medium for storing the program and data is not limited to such a ROM, and an optical and/or magnetic disk device (flexible disk, CD-ROM, DVD-ROM or the like) may be applied according to the type of the computer device to be a platform. In case where a computer device having a fixed disk device is used as the platform, the program and data may be prestored in the fixed disk device for distribution.

In case where a computer device capable of communicating with another computer device over a network is used as the platform, the program and data may be stored in a fixed disk device provided in a server unit located on the network, and may be distributed over the network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and are not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A game apparatus, connected to at least one other game apparatus by a communicator, that progresses a game while exchanging messages with the at least one other game apparatus and displays an image according to a progress of the game on a display, the game apparatus comprising:
a progress instruction input acceptor that accepts an instruction for progressing the game, excluding message exchange, based on a first operation of a player;
a game processor that executes a processing for progressing the game, excluding message exchange, according to the instruction accepted by the progress instruction input acceptor and progress information received from the at least one other game apparatus;
a display position input acceptor that accepts an input position corresponding to a display position on the display based on a second operation by the player;
a game situation data storage that stores, for each of a plurality of game situations, a message group, including at least one message, and an icon which represents contents of the at least one message included in the message group;
a game situation determiner that determines whether a current game situation of the game progressed by the game processor corresponds to a game situation of the plurality of game situations;
an icon display that, when the game situation determiner determines that the current game situation corresponds to the game situation, displays the icon stored for the game situation on the display;
a message display that, when the display position input acceptor accepts a first input position based on the second operation by the player that corresponds to the icon displayed on the display, displays the at least one message included in the message group stored for the game situation on the display;
a selected message transmitter that, when the display position input acceptor accepts a second input position based on the second operation by the player that corresponds to a message of the at least one message displayed on the display, transmits the message to the at least one other game apparatus from the communicator; and
a received message display that displays, on the display, a received message transmitted from the at least one other game apparatus and received by the communicator,
wherein, when the display position input acceptor accepts the second input position based on the second operation by the player that corresponds to the message, for a predetermined time period after the second input position is accepted, the game situation determiner determines whether a subsequent game situation of the game progressed by the game processor corresponds to one of the plurality of game situations based on a progress state of the game and also based on the message to which the second input position corresponds, and
the icon display is configured to simultaneously display the icon stored for the game situation that is determined to correspond to the current game situation and the icon stored for one of the plurality of game situations that is determined to correspond to one of a previous game situation and a following game situation.

2. The game apparatus according to claim 1, wherein the icon display displays the icon in a predetermined area of the display while moving the icon in a predetermined direction.

3. The game apparatus according to claim 1, wherein, when the game situation determiner determines that the current game situation of the game corresponds to at least two of the plurality of game situations, the icon display displays the icon stored for each of the at least two of the plurality of game situations on the display.

4. The game apparatus according to claim 1, wherein the communicator includes a near field communicator configured to communicate with the at least one other game apparatus within a predetermined distance restriction, and a wide area communicator configured to communicate with the at least one other game apparatus over a wide area network with no distance restriction,
the game situation determiner determines the current game situation according to whether a connection to the at least one other game apparatus is established by one of the near field communicator and the wide area communicator, and
the game situation data storage stores two message groups, each containing different messages according to whether the connection to the at least one other game apparatus is established by the near field communicator or the wide area communicator, for each of the plurality of game situations.

5. The game apparatus according to claim 4, wherein the near field communicator is configured to communicate with the at least one other game apparatus when the game apparatus and the at least one other game apparatus play the game in a same location,
the wide area communicator is configured to communicate with the at least one other game apparatus when the game apparatus and the at least one other game apparatus play the game even in different locations, and
nuances of messages displayed on the display when the near field communicator is used are different from those displayed when the wide area communicator is used.

6. The game apparatus according to claim 1, wherein, when the game situation determiner determines that the subsequent game situation corresponds to the one of the plurality of game situations within the predetermined time period, the icon display displays the icon stored for the one of the plurality of game situations on the display with an appearance of the icon being changed.

7. The game apparatus according to claim 1, wherein the game situation data storage stores the message group for each of the plurality of game situations in a first language based on a first location of the game apparatus, and
the selected message transmitter transmits the message in a second language based on a second location of the at least one other game apparatus.

8. A method executed by a computer apparatus for communicating with at least one other computer apparatus, for progressing a game while exchanging messages with the at least one other computer apparatus, and for displaying an image according to a progress of the game on a display,
the computer apparatus including a progress instruction input controller that accepts an instruction for progressing the game, excluding message exchange, based on a first operation of a player, a display position input controller that accepts an input position corresponding to a display position on the display based on a second operation by the player, a storage that stores data, and a communicator that transmits and receives data to and from the at least one other computer apparatus, the method comprising:

storing, in the storage, for each of a plurality of game situations, a message group, including at least one message, and an icon which represents contents of the at least one message included in the message group;

progressing the game, excluding message exchange, according to the instruction accepted by the progress instruction input controller and progress information received from the at least one other computer apparatus;

determining whether a current game situation of the game corresponds to a game situation of the plurality of game situations;

displaying, on the display, the icon stored for the game situation when it is determined that the current game situation of the game corresponds to the game situation;

displaying, when a first input position that corresponds to the icon displayed on the display is accepted by the display position input controller based on the second operation by the player, the at least one message included in the message group stored for the game situation on the display;

transmitting, when a second input position that corresponds to a message of the at least one message displayed on the display is accepted by the display position input controller based on the second operation by the player, the message to the at least one other computer apparatus from the communicator; and displaying a received message received by the communicator from the at least one other computer apparatus on the display, wherein, when the second input position that corresponds to the message is accepted by the display position input controller based on the second operation by the player, for a predetermined time period after the second input position is accepted, it is determined whether a subsequent game situation of the game corresponds to one of the plurality of game situations based on a progress state of the game and also based on the message to which the second input position corresponds, and the icon stored for the game situation that is determined to correspond to the current game situation is configured to be simultaneously displayed with the icon stored for one of the plurality of game situations that is determined to correspond to one of a previous game situation and a following game situation.

9. The method according to claim 8, wherein the icon is displayed in a predetermined area of the display and configured to move in a predetermined direction.

10. The method according to claim 8, wherein, when the current game situation is determined to correspond to at least two of the plurality of game situations, the icon stored for each of the at least two of the plurality of game situations is displayed on the display.

11. The method according to claim 8, wherein, when the subsequent game situation is determined to correspond to the one of the plurality of game situations within the predetermined time period, the icon stored for the one of the plurality of game situations is displayed on the display with an appearance of the icon being changed.

12. The method according to claim 8, wherein the message group stored for each of the plurality of game situations is stored in a first language based on a first location of the computer apparatus, and the message transmitted to the at least one other computer apparatus is transmitted in a second language based on a second location of the at least one other computer apparatus.

13. A non-transitory computer readable recording medium including a program which is executable by a computer apparatus for communicating with at least one other computer apparatus, for progressing a game while exchanging messages with the at least one other computer apparatus, and for displaying an image according to a progress of the game on a display, the computer apparatus including a progress instruction input that inputs an instruction for progressing the game, excluding message exchange, based on a first operation of a player, a display position input that inputs an input position corresponding to a display position on the display based on a second operation of the player, a storage that stores data, and a communicator that transmits and receives data to and from the at least one other computer apparatus, the program causing the computer apparatus to execute:

storing, in the storage, for each of a plurality of game situations, a message group, including at least one message, and an icon which represents contents of the at least one message included in the message group;

progressing the game, excluding message exchange, according to the instruction input from the progress instruction input and progress information received from the at least one other computer apparatus;

determining whether a current game situation of the game corresponds to a game situation of the plurality of game situations;

displaying, on the display, the icon stored for the game situation when it is determined that the current game situation of the game corresponds to the game situation;

displaying, when a first input position that corresponds to the icon displayed on the display is input by the display position input based on the second operation by the player, the at least one message included in the message group stored for the game situation on the display;

transmitting, when a second input position that corresponds to a message of the at least one message displayed on the display is input by the display position input based on the second operation by the player, the message to the at least one other computer apparatus from the communicator; and displaying, on the display, a received message transmitted from the at least one other computer apparatus and received by the communicator, wherein, when the second input position that corresponds to the message is input by the display position input based on the second operation by the player, for a predetermined time period after the second input position is input, the program causes the computer apparatus to determine whether a subsequent game situation of the game corresponds to one of the plurality of game situations based on a progress state of the game and also based on the message to which the second input position corresponds, and the icon stored for the game situation that is determined to correspond to the current game situation is configured to be simultaneously displayed with the icon stored for one of the plurality of game situations that is determined to correspond to one of a previous game situation and a following game situation.

14. The non-transitory computer readable recording medium according to claim 13, wherein the icon is displayed in a predetermined area of the display and configured to move in a predetermined direction.

15. The non-transitory computer readable recording medium according to claim 13, wherein, when the current game situation is determined to correspond to at least two of the plurality of game situations, the icon stored for each of the at least two of the plurality of game situations is displayed on the display.

16. The non-transitory computer readable recording medium according to claim 13, wherein, when the subsequent game situation is determined to correspond to the one of the plurality of game situations within the predetermined time period, the icon stored for the one of the plurality of game situations is displayed on the display with an appearance of the icon being changed.

17. The non-transitory computer readable recording medium according to claim 13, wherein the message group stored for each of the plurality of game situations is stored in a first language based on a first location of the computer apparatus, and the message transmitted to the at least one other computer apparatus is transmitted in a second language based on a second location of the at least one other computer apparatus.

* * * * *